(12) United States Patent
Worzyk

(10) Patent No.: US 9,164,252 B2
(45) Date of Patent: Oct. 20, 2015

(54) APPARATUS AND A METHOD FOR JOINTING A FIRST AND A SECOND OPTICAL FIBRE OF A COMPOSITE CABLE

(75) Inventor: Thomas Worzyk, Lyckeby (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/400,018

(22) PCT Filed: Jun. 21, 2012

(86) PCT No.: PCT/EP2012/061961
§ 371 (c)(1),
(2), (4) Date: Nov. 10, 2014

(87) PCT Pub. No.: WO2013/189542
PCT Pub. Date: Dec. 27, 2013

(65) Prior Publication Data
US 2015/0125116 A1    May 7, 2015

(51) Int. Cl.
*G02B 6/44* (2006.01)
*G02B 6/38* (2006.01)
*G02B 6/255* (2006.01)

(52) U.S. Cl.
CPC .............. *G02B 6/4475* (2013.01); *G02B 6/255* (2013.01); *G02B 6/3801* (2013.01); *G02B 6/443* (2013.01);
(Continued)

(58) Field of Classification Search
CPC .... G02B 6/255; G02B 6/3801; G02B 6/4427; G02B 6/443; G02B 6/4475; G02B 6/38; G02B 6/44; G02B 6/4416; G02B 6/2558; G02B 6/444
USPC ................................................ 385/42; 65/407
See application file for complete search history.

(56) References Cited

U.S. PATENT DOCUMENTS 4,699,460 A * 10/1987 Szentesi .......................... 385/71
4,812,001 A *  3/1989 Tomita et al. ................. 385/123
(Continued)

FOREIGN PATENT DOCUMENTS

CN    101719651 A    6/2010
CN    201917691 U    8/2011
(Continued)

*Primary Examiner* — Peter Radkowski
(74) *Attorney, Agent, or Firm* — Birch, Stewart, Kolasch & Birch, LLP

(57) ABSTRACT

An apparatus and a method for jointing a first optical fiber and a second optical fiber, the apparatus includes a composite cable, where the composite cable includes an electric power cable, a first optical fiber cable including the first optical fiber, and a second optical fiber cable including the second optical fiber, wherein the apparatus includes a first routing device and a second routing device, each routing device being arranged to change the direction of a fiber optic path from a first axis to a second axis and including a first optical fiber portion aligned with the first axis, a second optical fiber portion aligned with the second axis, and an intermediate optical fiber portion integral with the first and second optical fiber portions and extending through an arc between the first and second optical fiber portions, the intermediate optical fiber portion in the region of the arc having a reduced diameter in relation to the diameter of the first and second optical fiber portions, wherein the first optical fiber is optically connected to the first optical fiber portion of the first routing device, wherein the second optical fiber is optically connected to the first optical fiber portion of the second routing device, and wherein the second optical fiber portion of the first routing device is optically connected to the second optical fiber portion of the second routing device.

23 Claims, 3 Drawing Sheets

(52) U.S. Cl.
CPC ............ *G02B 6/4416* (2013.01); *G02B 6/4427* (2013.01); *G02B 6/2558* (2013.01); *G02B 6/444* (2013.01)

(56) References Cited

U.S. PATENT DOCUMENTS

| | | | |
|---|---|---|---|
| 5,138,676 A * | 8/1992 | Stowe et al. | 385/32 |
| 5,319,732 A * | 6/1994 | Jones | 385/135 |
| 5,452,393 A * | 9/1995 | Stowe et al. | 385/123 |
| 6,281,431 B1 | 8/2001 | Cumley | |
| 6,612,753 B1 * | 9/2003 | Cryan et al. | 385/96 |
| 7,269,320 B2 * | 9/2007 | Herbst | 385/100 |
| 7,403,686 B1 * | 7/2008 | Zervas | 385/100 |
| 8,238,705 B2 * | 8/2012 | Lewallen et al. | 385/100 |
| 2003/0223711 A1 * | 12/2003 | Ishii | 385/95 |
| 2003/0231849 A1 * | 12/2003 | Rodriguez et al. | 385/135 |
| 2009/0285539 A1 * | 11/2009 | Lewallen et al. | 385/134 |
| 2010/0277329 A1 * | 11/2010 | Worzyk | 340/679 |
| 2011/0135247 A1 * | 6/2011 | Achara et al. | 385/12 |
| 2012/0033928 A1 | 2/2012 | Hansson et al. | |

FOREIGN PATENT DOCUMENTS

| | | |
|---|---|---|
| DE | 40 16 694 A1 | 12/1991 |
| EP | 0 646 817 A2 | 4/1995 |
| JP | 55-62415 A | 5/1980 |
| JP | 59-212813 A | 12/1984 |

* cited by examiner

APPARATUS AND A METHOD FOR JOINTING A FIRST AND A SECOND OPTICAL FIBRE OF A COMPOSITE CABLE

TECHNICAL FIELD

The present invention relates to an apparatus for jointing a first optical fibre and a second optical fibre, the apparatus comprising a composite cable, where the composite cable comprises an electric power cable, a first optical fibre cable comprising the first optical fibre, and a second optical fibre cable comprising the second optical fibre. Further, the present invention relates to a method for jointing a first optical fibre and a second optical fibre, the first optical fibre being included in a first optical fibre cable and the second optical fibre being included in a second optical fibre cable, and the first and second optical fibre cables are included in a composite cable which further comprises an electric power cable.

BACKGROUND OF THE INVENTION

A composite cable including an optical fibre cable and an electric power cable may for example be used in offshore applications, such as submarine power and/or communication cables. Another example is installation environments that require monitoring of the operation of electricity, wherein the optical fibre cable may be used for detecting temperatures of the electric power cable. The optical fibre cable may comprise one or a plurality of parallel optical fibres and the optical fibre cable may comprise a tube in which optical fibre/-s is/are accommodated and protected. The optical fibre is used for fibre-optic communication and may thus send data along the composite cable. An optical fibre cable including a tube, e.g. made of a metal material, which houses one or a plurality of optical fibres, may be called an FIMT, Fibre in Metal Tube. The composite cable may be called a composite power cable.

Two composite cables or two cable ends often need to be connected to one another, for example when installing the composite cables in the application at hand, or in a jointing process if the cable is broken and requires repair. Also, in a continuous composite power cable, two optical fibre cables may need to be jointed in case of fibre break or fibre cable damage. In general, when jointing the optical fibres of two optical fibre cables, which may extend after one another along the axial extension of the composite cable, a certain extra optical fibre length has to be added in order to accomplish the jointing of the optical fibres of two optical fibre cables. In general, the electric power cable of the composite cable comprises one or a plurality of electrical conductors, e.g. three, and a circumferential cover located outside of the electrical conductor/-s. The cover may be armouring, or an armouring cover, provided to protect the elements of the composite cable located within the armouring. The cover may also be a circumferential conductive screen located outside of a circumferential electrically insulating layer which in turn is located outside of the electrical conductor, wherein the screen is arranged to be held at ground potential. The composite cable may also comprise a circumferential outer jacket, e.g. made of polymer material, located outside of the cover and of the electrical conductor in order to provide further protection. The composite cable may comprise additional layers or jackets of different materials, e.g. an additional circumferential electrically insulating layer.

In general, the optical fibre cable is located inside of the outer jacket or embedded within or located inside of the cover. Often, the armouring, or armouring cover, is formed by a plurality of parallel longitudinal wires in one or a plurality of layers in the radial direction. When producing a composite cable having wire armouring, the wires are applied close to one another along the longitudinal extension of the cable, generally along helical lines. One or a plurality of the wires may be replaced by an optical fibre cable, whereby the optical fibre cable requires no additional space inside of or outside of the armouring. After the production of the composite cable, when jointing two already manufactured composite cables or repairing a defective composite cable, two optical fibres or two optical fibre ends of two optical fibre cables may need to be jointed. However, since the optical fibre cable is embedded in the composite cable and essentially axially immovable, e.g. by being located inside of the jacket or even inside of the armouring, or by being embedded in and being part of the cover, e.g. the armouring, as described above, extra optical fibre length needs to be added to be able to joint two optical fibres. The extra optical fibre length is often needed because of the equipment used for jointing optical fibres, e.g. a fusion splicing apparatus, which requires a space between the optical fibre cable and the remainder part of the composite cable. After completion of the splicing of the optical fibres, an overlength of optical fibre remains, i.e. an extra optical fibre length. This optical fibre overlength has to be dealt with and protected from the exterior environment outside of the composite cable. The optical fibre overlength may also take up space or room such that the outer dimension of the composite cable is increased, which may be a disadvantage. An optical fibre cable may also be sensitive to harsh bending, which should be considered when taken care of the extra optical fibre length.

In prior art there are examples of how to take care of the extra optical fibre length created when jointing optical fibres of a composite cable.

US 2012/0033928-A1 discloses a cable joint for jointing two cable ends of an optical fibre cable of an optical fibre composite electric power cable. The cable joint includes a repair box having storage for storing extra length needed for jointing fibres of the optical fibre cable.

CN 101719651-A describes a composite power cable connection box used for an optical fibre arranged in the centre of a conductor.

EP 0 646 817-A2 discloses means for jointing a bundle of longitudinal elements, such as a composite electrical/fibre optic cable. A jointing compartment for the fibres is provided where jointing can be undertaken.

JP 59212813-A describes a connection part of a power cable containing optical fibre.

U.S. Pat. No. 6,281,431-B1 discloses a cable joint for a multi-core cable including an outer sheath surrounding at least one electric pilot line and/or at least one optical fibre line and/or tube therefore.

CN 201917691 describes a fibre optics attachment structure for connecting the fibre optics in heterogeneity electricity optical fibre compound power cable.

THE OBJECT OF THE INVENTION

The object of the present invention is to provide an improved joint between optical fibres of a composite cable which comprises at least one electrical power cable and at least one optical fibre cable.

A further object of the present invention is to improve the jointing of optical fibres of a composite cable which comprises at least one electrical power cable and at least one optical fibre cable.

Another object of the present invention is to provide a joint between optical fibres of a composite cable, which does not increase, or only to a small or smaller extent increases, the outer dimension of the composite cable.

SUMMARY OF THE INVENTION

The above-mentioned objects of the present invention are attained by providing an apparatus for jointing a first optical fibre and a second optical fibre, the apparatus comprising a composite cable, where the composite cable comprises an electric power cable, a first optical fibre cable comprising the first optical fibre, and a second optical fibre cable comprising the second optical fibre, wherein the apparatus comprises a first routing device and a second routing device, each routing device being arranged to change the direction of a fibre optic path from a first axis to a second axis and comprising a first optical fibre portion aligned with the first axis, a second optical fibre portion aligned with the second axis, and an intermediate optical fibre portion integral with the first and second optical fibre portions and extending through an arc between the first and second optical fibre portions, the intermediate optical fibre portion in the region of the arc having a reduced diameter in relation to the diameter of the first and second optical fibre portions, wherein the first optical fibre is optically connected to the first optical fibre portion of the first routing device, wherein the second optical fibre is optically connected to the first optical fibre portion of the second routing device, and wherein the second optical fibre portion of the first routing device is optically connected to the second optical fibre portion of the second routing device.

By means of the apparatus according the present invention and the innovative application of the two routing devices, the extra optical fibre length resulting from the jointing of a first optical fibre and a second optical fibre is radically reduced, whereby an improved joint between optical fibres of a composite cable is provided. By means of the apparatus according the present invention and the innovative application of the two routing devices, the outer dimension of the composite cable is not increased, or only increased to a very small extent, in relation to the un-jointed part of the composite cable. By means of the innovative application of the routing devices, the joint between the first and second optical fibres takes up little lateral space in relation to the axial direction of each of the first and second optical fibre cables, which is described in more detail in the detailed description of preferred embodiments.

One may provide additional routing devices, e.g. another two routing devices, or another four routing devices, to be optically connected to the second optical fibre portions of the first and second routing devices. One may optically connect each of the first and second optical fibres to the first optical fibre portion of the respective routing device via an intermediate optical fibre part. The second optical fibre portion of the first routing device may be optically connected to the second optical fibre portion of the second routing device via an intermediate optical fibre part.

The jointed first and second optical fibres of the first and second optical fibre cables may form a common fibre optic path. Each optical fibre and each optical fibre portion is optically connected to an optical fibre or optical fibre portion such that a fibre optic path is provided through the optical connection/-s and the optical fibres and optical fibre portions connected through the optical connection/-s.

According to an advantageous embodiment of the apparatus according to the present invention, the first optical fibre is joined to the first optical fibre portion of the first routing device, and the second optical fibre is joined to the first optical fibre portion of the second routing device. This is an efficient way to optically connect each optical fibre to the first optical fibre portion of the respective routing device, which further improves the joint between optical fibres of a composite cable. Alternatively, each of the first and second optical fibres may be joined to an intermediate optical fibre part which in turn is joined to the first optical fibre portion of the respective routing device.

According to a further advantageous embodiment of the apparatus according to the present invention, the second optical fibre portion of the first routing device is joined to the second optical fibre portion of the second routing device. This is an efficient way to optically connect the two second optical fibre portions, which further improves the joint between optical fibres of a composite cable. Alternatively, the second optical fibre portion of the first routing device may be joined to an intermediate optical fibre part which in turn is joined to the second optical fibre portion of the second routing device. Alternatively, the second optical fibre portion of the first routing device may be joined to an optical fibre portion of a third routing device which is optically connect to a fourth routing device, and the second optical fibre portion of the second routing device may be joined to an optical fibre portion of the fourth routing device. Alternatively, further routing devices may be added and optically connected.

According to another advantageous embodiment of the apparatus according to the present invention, the electric power cable comprising at least one electrical conductor and a circumferential cover located outside of the electrical conductor. The apparatus according to the present invention is especially advantageous for a composite cable having an electric power cable comprising a circumferential cover located outside of an electrical conductor, for which it is difficult to take care of the extra optical fibre length resulting from a prior art jointing of optical fibres. However, the apparatus according to the present invention is also advantageous for other sorts of composite cables. Outside of the circumferential cover, one or a plurality of additional circumferential covers may be provided.

According to yet another advantageous embodiment of the apparatus according to the present invention, the composite cable comprises a circumferential outer jacket located outside of the cover and of the electrical conductor, and the outer jacket surrounds the first and second optical fibre cables. The apparatus according to the present invention is especially advantageous for a composite cable having an electric power cable comprising a circumferential outer jacket located outside of the cover and of the electrical conductor, for which it is difficult to take care of the extra optical fibre length resulting from a prior art jointing of optical fibres. However, the apparatus according to the present invention is also advantageous for other sorts of composite cables.

According to still an advantageous embodiment of the apparatus according to the present invention, the cover is at least partially formed by a plurality of wires and the first and second optical fibre cables. The apparatus according to the present invention is especially advantageous for a composite cable having an electric power cable comprising a circumferential cover at least partially formed by a plurality of wires and the first and second optical fibre cables, where the first and second optical fibre cables are embedded in the cover of stands and where it is difficult to take care of the extra optical fibre length resulting from a prior art jointing of optical fibres optical. However, the apparatus according to the present invention is also advantageous for other sorts of composite cables. The wires may be made of a metal material, or a polymer material, or mixture thereof.

According to an advantageous embodiment of the apparatus according to the present invention, where the cover is at least partially formed by a plurality of wires and the first and second optical fibre cables, the cover is in the form of armouring, or an armouring cover. Alternatively, the cover may be in the form of other types of covers.

According to a further advantageous embodiment of the apparatus according to the present invention, where the cover is at least partially formed by a plurality of wires and the first and second optical fibre cables, the composite cable comprises a circumferential electrically insulating layer located outside of the electrical conductor, wherein the cover is in the form of a circumferential conductive screen located outside of the electrically insulating layer, and wherein the screen is arranged to be held at ground potential. Alternatively, the cover may be in the form of other types of covers. The armouring may also be conductive and may be arranged to be held at ground potential.

According to another advantageous embodiment of the apparatus according to the present invention, the first and second routing devices are positioned in a space between at least two wires of the plurality of wires. By means of this embodiment, the outer dimension of the composite cable is not increased, or only increased to a very small extent, in relation to the un-jointed part of the composite cable, whereby an improved joint between optical fibres of a composite cable is provided.

According to still another advantageous embodiment of the apparatus according to the present invention, each of the first and second routing devices comprises an outer member holding at least the first and second optical fibre portions for fixing the first and second optical fibre portions along the first and second axes, respectively. By means of this embodiment, a further improved joint between optical fibres of a composite cable is provided. By means of routing devices having an outer member, the jointing of optical fibres of a composite cable, which comprises an electrical power cable and an optical fibre cable, is facilitated and improved.

According to yet another advantageous embodiment of the apparatus according to the present invention, the intermediate optical fibre portion of each of the first and second routing devices in the region of the arc has a substantially reduced diameter in relation to the diameter of the first and second optical fibre portions. By means of this embodiment, the outer dimension of the composite cable is not increased, or only increased to a very small extent, in relation to the un-jointed part of the composite cable, whereby a further improved joint between optical fibres of a composite cable is provided.

According to an advantageous embodiment of the apparatus according to the present invention, the intermediate optical fibre portion of each of the first and second routing devices extends through an arc of radius of the order of two centimeters or less between the first and second optical fibre portions. By means of this embodiment, the outer dimension of the composite cable is not increased, or only increased to a very small extent, in relation to the un-jointed part of the composite cable, whereby a further improved joint between optical fibres of a composite cable is provided.

According to a further advantageous embodiment of the apparatus according to the present invention, the intermediate optical fibre portion of each of the first and second routing devices extends through an arc of radius less than 10 millimeters, preferably less than 5 millimeters, more preferably less than 3 millimeters, between the first and second optical fibre portions. By means of this embodiment, the outer dimension of the composite cable is not increased, or only increased to a very small extent, in relation to the un-jointed part of the composite cable, whereby a further improved joint between optical fibres of a composite cable is provided.

According to another advantageous embodiment of the apparatus according to the present invention, the composite cable is a submarine composite cable. The apparatus according to the present invention is especially advantageous for a composite cable arranged for submarine applications. Alternatively, the composite cable may be a land composite cable.

The above-mentioned objects of the present invention are also attained by providing a method for jointing a first optical fibre and a second optical fibre, the first optical fibre being included in a first optical fibre cable and the second optical fibre being included in a second optical fibre cable, and the first and second optical fibre cables are included in at least one composite cable which further comprises an electric power cable, wherein the method comprises the following steps:

optically connecting the first optical fibre to a first optical fibre portion of a first routing device;

optically connecting the second optical fibre to a first optical fibre portion of a second routing device, each routing device being arranged to change the direction of a fibre optic path from a first axis to a second axis and comprising the first optical fibre portion which is aligned with the first axis, a second optical fibre portion aligned with the second axis, and an intermediate optical fibre portion integral with the first and second optical fibre portions and extending through an arc between the first and second optical fibre portions, the intermediate optical fibre portion in the region of the arc having a reduced diameter in relation to the diameter of the first and second optical fibre portions; and optically connecting the second optical fibre portion of the first routing device to the second optical fibre portion of the second routing device.

By means of the method according to the present invention, the jointing of optical fibres of a composite cable, which comprises an electrical power cable and an optical fibre cable, is facilitated and improved, especially for composite cable already produced, where repair of the composite cable is required, for example. Positive technical effects of the method according to the present invention, and its embodiments, correspond to the technical effects mentioned in connection with the apparatus according to the present invention, and its embodiments. The above-mentioned steps of the method may be performed in any order.

According to an advantageous embodiment of the method according to the present invention, the first optical fibre is optically connected to the first optical fibre portion of the first routing device by joining the first optical fibre to the first optical fibre portion of the first routing device, and the second optical fibre is optically connected to the first optical fibre portion of the second routing device by joining the second optical fibre to the first optical fibre portion of the second routing device.

According to a further advantageous embodiment of the method according to the present invention, the second optical fibre portion of the first routing device is optically connected to the second optical fibre portion of the second routing device by joining the second optical fibre portion of the first routing device to the second optical fibre portion of the second routing device.

According to a further advantageous embodiment of the method according to the present invention, the method is characterized by jointing the first optical fibre and the second optical fibre that are at least partially surrounded by an outer jacket located outside of an circumferential cover and of an electrical conductor included in the electric power cable.

According to a further advantageous embodiment of the method according to the present invention, the method is characterized by jointing the first optical fibre and the second optical fibre that are included in a first optical fibre cable and a second optical fibre cable, respectively, which together with a plurality of wires at least partially form the cover.

According to still another advantageous embodiment of the method according to the present invention, the method is characterized by placing the first and second routing devices in a space between at least two wires of the plurality of wires. Advantageously, the first and second routing devices are placed in the space between at least two wires of the plurality of wires after the first and second optical fibres and the first and second optical fibre portions of the first and second routing devices have been optically connected.

According to an advantageous embodiment of the method according to the present invention, the first optical fibre is joined to the first optical fibre portion of the first routing device by means of fusion splicing, and the second optical fibre is joined to the first optical fibre portion of the second routing device by means of fusion splicing. By means of this embodiment, the jointing of optical fibres of a composite cable, which comprises an electrical power cable and an optical fibre cable, is further facilitated and improved.

According to another advantageous embodiment of the method according to the present invention, the second optical fibre portion of the first routing device is joined to the second optical fibre portion of the second routing device by means of fusion splicing. By means of this embodiment, the jointing of optical fibres of a composite cable, which comprises an electrical power cable and an optical fibre cable, is further facilitated and improved.

According to yet another advantageous embodiment of the method according to the present invention, the method is characterized by jointing the first optical fibre and the second optical fibre at least partially by means of an apparatus as claimed in any of the appended claims 1 to 14, or by means of an apparatus according to any of the embodiments of the apparatus disclosed herein.

The above-mentioned features and embodiments of the apparatus and method, respectively, may be combined in various possible ways providing further advantageous embodiments.

Further advantageous embodiments of the apparatus and method according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Figure 1:
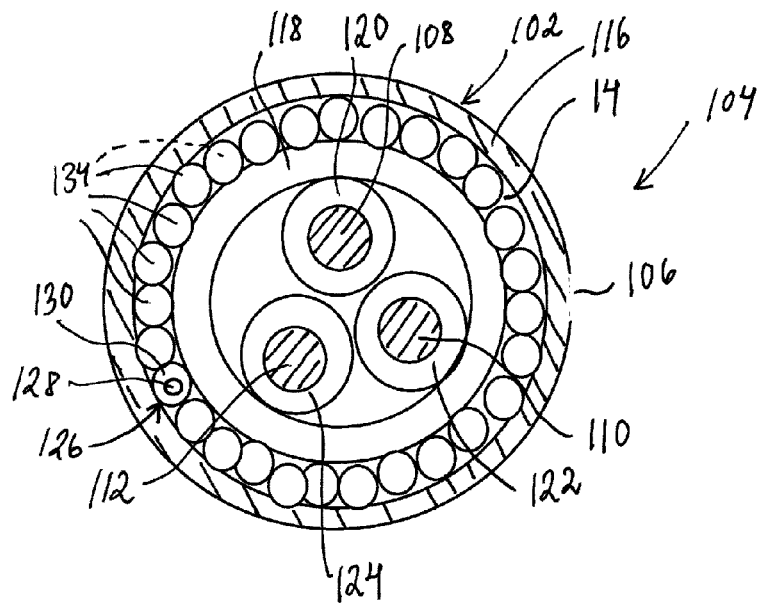
FIG. 1 is a schematic cross-section view of a first embodiment of the composite cable included in the apparatus according to the present invention.
Figure 2:
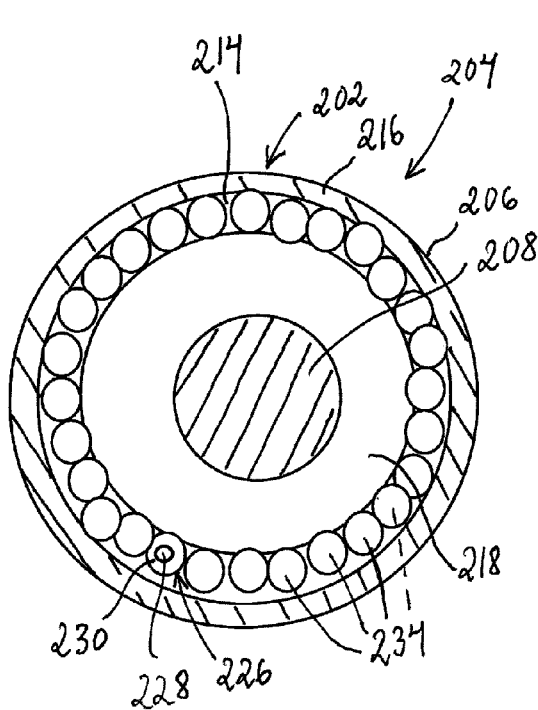
FIG. 2 is a schematic cross-section view of a second embodiment of the composite cable included in the apparatus according to the present invention.
Figure 3:
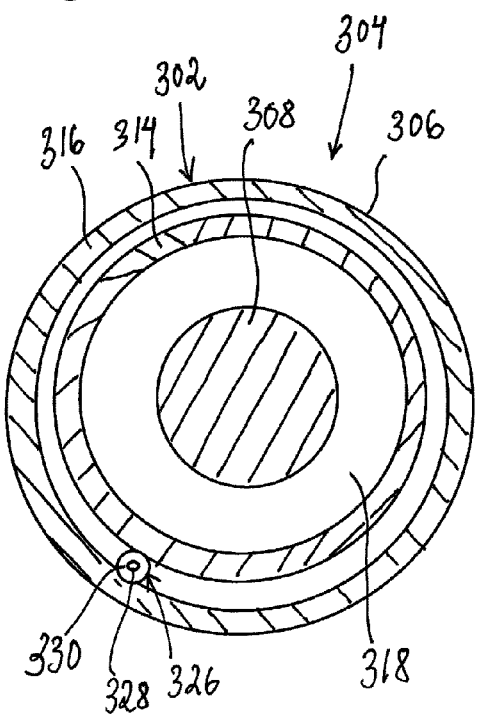
FIG. 3 is a schematic cross-section view of a third embodiment of the composite cable included in the apparatus according to the present invention.

FIGS. 1-3 schematically illustrate in cross-section three embodiments of the composite cable 102; 202; 302 included in the apparatus 104; 204; 304 according to the present invention. Each composite cable 102; 202; 302 may be called a composite power cable. Each composite cable 102; 202; 302 may be a composite cable for alternating current or direct current. Each composite cable 102; 202; 302 may be a submarine composite cable or a land composite cable. A submarine composite cable may have an axial extension of up to approximately 100 km. A land composite cable may have an axial extension of up to approximately 800 meters. However, other axial lengths are possible. Each composite cable 102; 202; 302 comprises at least one electric power cable 106; 206; 306. The electric power cable 106; 206; 306 may be adapted for low voltage, medium voltage and/or high voltage. In general, low voltage may be below 1000 V, medium voltage may be below 36 kV or below 56 kV, and high voltage may be about 56 kV and above. The apparatus according to the present invention is especially advantageous for high voltage applications. Each electric power cable 106; 206; 306 may comprise at least one electrical conductor 108, 110, 112; 208; 308 which may have an axial extension in the direction of the axial extension of the composite cable 102; 202; 302 and may be made of a suitable electrically conductive material, e.g. copper, or any other material. Each of the electric power cables 206; 306 shown in FIGS. 2-3 comprises one electrical conductor 208; 308, whereas the electric power cable 106 shown in FIG. 1 comprises a plurality of electrical conductors 108, 110, 112, e.g. three electrical conductors 108, 110, 112. However, the amount of the conductors may be different from what is illustrated in FIGS. 1-3. Each electric power cable 106; 206; 306 may comprise a circumferential cover 114; 214; 314, or covering, located outside of the electrical conductor 108, 110, 112; 208; 308. The cover 114; 214; 314 may be tubular and may surround the electrical conductor 108, 110, 112; 208; 308. Each electric power cable 106; 206; 306 may comprise a circumferential outer jacket 116; 216; 316 located outside of the cover 114; 214; 314 and outside of the electrical conductor 108, 110, 112; 208; 308. The outer jacket 116; 216; 316, or sheath, may be tubular and may be made of a polymer material, e.g. PVC or any other suitable material, and is provided to protect the elements of the composite cable 102; 202; 302 located inside of the outer jacket 116; 216; 316. The outer jacket 116; 216; 316 may have an axial extension in the direction of the axial extension of the composite cable 102; 202; 302. Each electric power cable 106; 206; 306 may comprise a circumferential, or tubular, electrically insulating layer 118; 218; 318 located outside of the electrical conductor 108, 110, 112; 208; 308. The electrically insulating layer 118; 218; 318 may be made of a dielectric material. The outer jacket 116; 216; 316 may be located outside of the electrically insulating layer 118; 218; 318. The electrically insulating layer 118; 218; 318 may be located inside of the cover 114; 214; 314. With reference to FIG. 1, each of the plurality of electrical conductors 108, 110, 112 may be surrounded by a tubular electrically insulating layer 120, 122, 124, made of a suitable polymer material, e.g. XLPE, or any other material, to isolate the electrical conductors 108, 110, 112 from one another. Each composite cable 102; 202; 302 comprises a first optical fibre cable 126; 226; 326 comprising a first optical fibre 128; 228; 328. The first optical fibre cable 126; 226; 326 may comprise a tube 130; 230; 330, e.g. made of a metal material, which houses the first optical fibre 128; 228; 328. Each composite cable 102; 202; 302 comprises a second optical fibre cable 231 (see FIGS. 5-8). In the cross-sections of FIGS. 1-3, the second optical fibre cable is not shown, since the second optical fibre cable 231 is positioned axially after the first optical fibre cable 126; 226; 326. However, one or a plurality of additional optical fibre cables may be provided to extend axially along the axial extension of the first and second optical fibre cable 126; 226, 231; 326. With reference to FIGS. 5-8, the second optical fibre cable 231 comprises a second optical fibre 232. The second optical fibre cable 231 may also comprise a tube (not shown), e.g. made of a metal material, which houses the second optical fibre 232. Each of the first and second optical fibre cables 126; 226, 231; 326 may comprise a plurality of optical fibres, e.g. 2 to 48 optical fibres, in general 2 to 4 optical fibres, which may be housed in the tube 130; 230; 330. Each outer jacket 116; 216; 316 may surround the first and second optical fibre cables 126; 226, 231; 326. Each of the first and second optical fibre cables 126; 226, 231; 326 may extend along the axial extension, or along a part of the axial extension, of the composite cable 102; 202; 302. Thus, each optical fibre 128; 228, 232; 328 and each tube 130; 230; 330 may extend along the axial extension, or along a part of the axial extension, of the composite cable 102; 202; 302. Each tube may have a diameter of about 1 to 4 mm. However, other dimensions are possible. Each tube may be surrounded by a layer of a polymer material. Each optical fibre 128; 228, 232; 328 may be a flexible transparent fiber made of a pure glass, e.g. silica. The function and structure of optical fibres are well known to the person skilled in the art and are thus not disclosed in more detail. Each optical fibre 228, 232 may be used for fibre-optic communication, by way of light, in ways known to the skilled person and is thus not discussed in more detail.

With reference to FIG. 3, the first optical fibre cable 326 and the second optical fibre cable (not shown) are located between the outer jacket 316 and the cover 314. Other positions may be possible. The cover 314 of FIG. 3 may be a conductive screen arranged to be held at ground potential, and may be used as a circuit protective conductor for the equipment supplied by the composite cable.

With reference to FIGS. 1-2, the cover 114; 214 may be at least partially formed by a plurality of wires 134, 234 and the first and second optical fibre cables 126; 226, 231. The wires may be made of a metal material, or a polymer material, or mixture thereof. The metal material may be stainless steel, copper, or alloys thereof, e.g. brass. Other materials are possible. Each wire may have a diameter of about 1 to 12 mm, e.g. 3 to 8 mm. Each wire may have a circular cross-section, an oval cross-section, or a rectangular cross-section, or any other suitable cross-section. However, other dimensions are possible. The cover 114; 214 may be in the form of armouring, or an armouring cover, for protecting the elements of the composite cable 102; 202 located inside of the cover 114; 214. The armouring may comprise about 80 to 100 wires. However, other numbers are possible. The cover 114; 214 may be a conductive screen arranged to be held at ground potential, and may be used as a circuit protective conductor for the equipment supplied by the composite cable 102; 202. In FIGS. 1 and 2, only one layer of wires combined with the first and second optical fibre cables is shown. However, it is to be understood that each cover 114; 214 may comprise one or a plurality of additional layers of wires which may adjoin one another. The first and second optical fibre cables may be embedded in the outer layer/-s of a plurality of layers of wires of the cover.

Each composite cable 102; 202; 302 may comprise one or a plurality of additional layers or jackets of different materials, e.g. an additional circumferential electrically insulating layer, an additional circumferential conductive layer, an additional semiconducting layer etc. The layers may be tubular. Each composite cable 102; 202; 302 may comprise additional cable features known to the skilled person. The operation and function of conventional electric power cables are well known to the person skilled in the art and thus not discussed in more detail.

Figure 4:
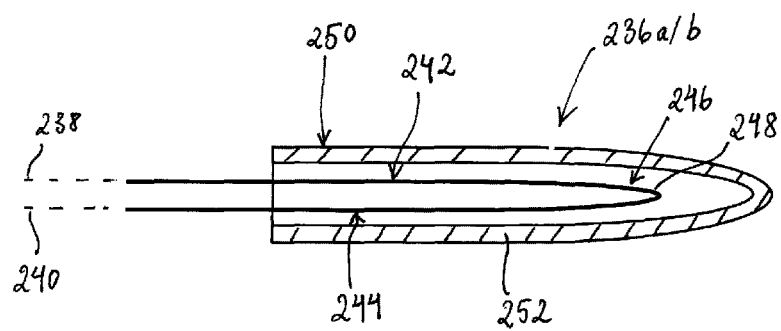
FIG. 4 is a schematic longitudinal cross-section view of an embodiment of the routing device included in the apparatus according to the present invention.

FIG. 4 schematically illustrates in longitudinal cross-section an embodiment of a routing device 236*a*/b included in an embodiment of the apparatus 204 according to the present invention. The apparatus 204 comprises a first routing device 236*a* and a second routing device 236*b*, each of which may correspond to the routing device 236*a*/b shown in FIG. 4. Each routing device 236*a-b* of the apparatus 204 is arranged to change the direction of a fibre optic path from a first axis 238 to a second axis 240 and comprises a first optical fibre portion 242 aligned with the first axis 238, a second optical fibre portion 244 aligned with the second axis 240, and an intermediate optical fibre portion 246 integral with the first and second optical fibre portions 242, 244 and extending through an arc 248 between the first and second optical fibre portions 242, 244. The intermediate optical fibre portion 246 in the region of the arc 248 has a reduced diameter in relation to the diameter of the first and second optical fibre portions 242, 244. The intermediate optical fibre portion 246 in the region of the arc 248 may have a substantially reduced diameter in relation to the diameter of the first and second optical fibre portions 242, 244. Each of the first and second routing devices 236*a-b* may comprise an outer member 250 holding at least the first and second optical fibre portions 242, 244 for fixing the first and second optical fibre portions 242, 244 along the first and second axes 238, 240, respectively. The outer member 250 may comprise a casing 252 housing at least the intermediate optical fibre portion 246. The intermediate optical fibre portion 246 of each of the first and second routing devices 236*a-b* may extend through an arc 248 of radius of the order of two centimeters or less between the first and second optical fibre portions 242, 244. The intermediate optical fibre portion 246 of each of the first and second routing devices 236*a-b* may extend through an arc 248 of radius less than 10 millimeters, preferably less than 5 millimeters, more preferably less than 3 millimeters, e.g., between the first and second optical fibre portions 242, 244. Each intermediate optical fibre portion 246 may have been treated to have a reduced diameter in relation to the diameter of the first and second optical fibre portions 242, 244 in a manner enabling reduction of likelihood of mechanical failure of each routing device 236*a-b* over time without introducing substantial optical loss. Each routing device 236*a-b* may provide a fixed 180 degree bend of the fibre optic path. Each routing device 236*a-b* may be an off-the-shelf product and is thus not disclosed in more detail.

Figure 8:
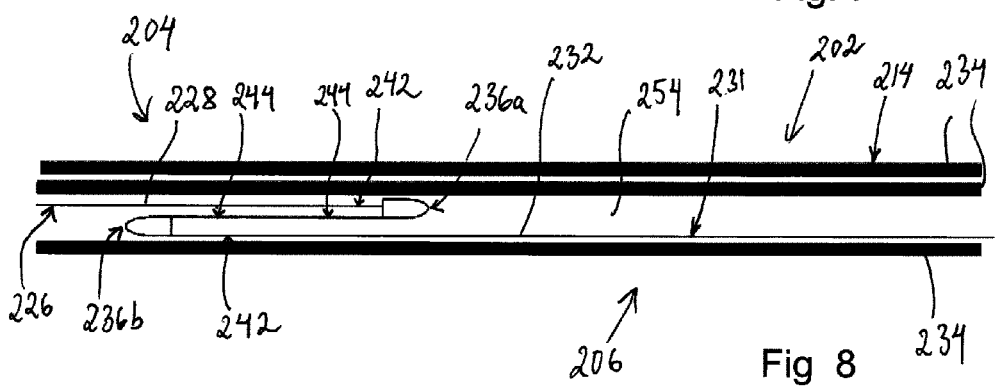

FIG. 8 schematically illustrates a portion of the composite cable 202 of FIG. 2 along an axial extension of the composite cable 202 and shows a few of the wires 234 of the cover 214. The first optical fibre 228 of the first optical fibre cable 226 is optically connected, or optically coupled, to the first optical fibre portion 242 of the first routing device 236*a*. The second optical fibre 232 of the second optical fibre cable 231 is optically connected, or optically coupled, to the first optical fibre portion 242 of the second routing device 236*b*. The second optical fibre portion 244 of the first routing device 236a is optically connected, or optically coupled, to the second optical fibre portion 244 of the second routing device 236b. Each optical fibre 228, 232 and each optical fibre portion 242, 244 is optically connected to an optical fibre 228, 232 or optical fibre portion 242, 244 such that a fibre optic path is provided through each connection, which may be called an optical connection or fibre splice, and through the optical fibres 228, 232 and the optical fibre portions 242, 244 connected through the connection/-s. The first optical fibre 228 may be joined to the first optical fibre portion 242 of the first routing device 236a, and the second optical fibre 232 may be joined to the first optical fibre portion 242 of the second routing device 236b. The second optical fibre portion 244 of the first routing device 236a may be joined to the second optical fibre portion 244 of the second routing device 236b.

Alternatively, each of the first and second optical fibres 228, 232 may be optically connected to the first optical fibre portion 242 of the respective routing device 236a-b via an intermediate optical fibre part. Alternatively, the second optical fibre portion 244 of the first routing device 236a may be optically connected to the second optical fibre portion 244 of the second routing device 236b via an intermediate optical fibre part.

The first and second routing devices 236a-b may be positioned in a space 254 between at least two wires 234 of the plurality of wires 234, whereby the outer dimension of the composite cable 202 is not increased, or only increased to a very small extent, in relation to the un-jointed part of the composite cable 202. It is to be understood that each of the apparatuses 104, 304 of FIGS. 1 and 3 comprises corresponding first and second routing device 236a-b to which their first and second optical fibres are optically connected.

With reference to FIGS. 5-8, aspects of the method for jointing a first optical fibre 228 and a second optical fibre 232 according to the present invention are schematically illustrated. The first optical fibre 228 is included in a first optical fibre cable 226 and the second optical fibre 232 is included in a second optical fibre cable 231. The first and second optical fibre cables 226, 231 may be included in a composite cable 102; 202; 302 as illustrated in any of the FIGS. 1-4. Alternatively, the first optical fibre cable 226 may be included in a first composite cable, whereas the second optical fibre cable 231 may be included in a second composite cable, where the first and second composite cables may be intended to be jointed. The first optical fibre 228 and the second optical fibre 231 may be at least partially surrounded by the outer jacket 216 located outside of the circumferential cover 214 and outside of the electrical conductor 208 included in the electric power cable 206. The first optical fibre 228 and the second optical fibre 232 may be included in a first optical fibre cable 226 and a second optical fibre cable 231, respectively, which together with a plurality of wires 234 at least partially form the cover 214. The method may comprise the steps as disclosed hereinafter.

Figure 5:
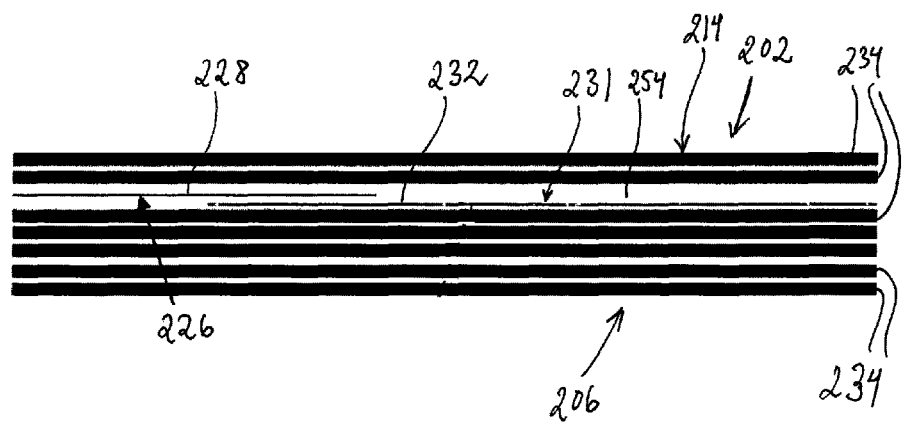
FIGS. 5-8 are schematic partial views illustrating aspects of the method and the apparatus according to the present invention.
Figure 6:
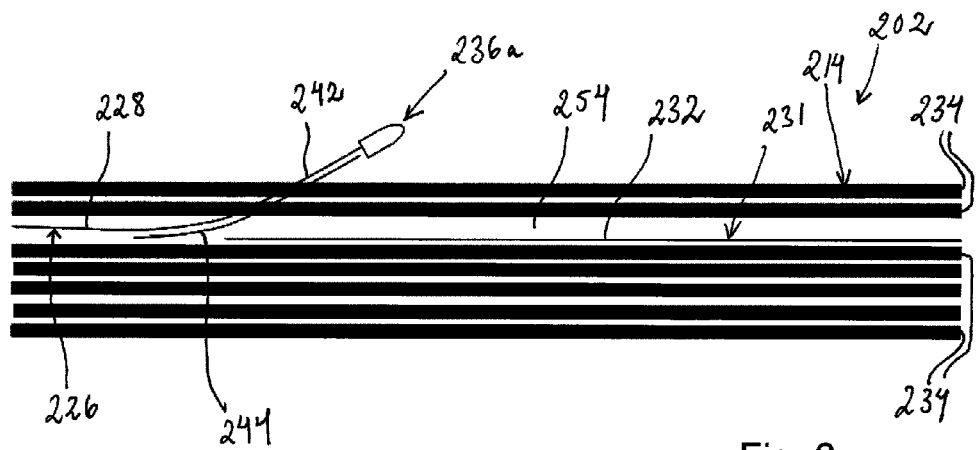
Figure 7:
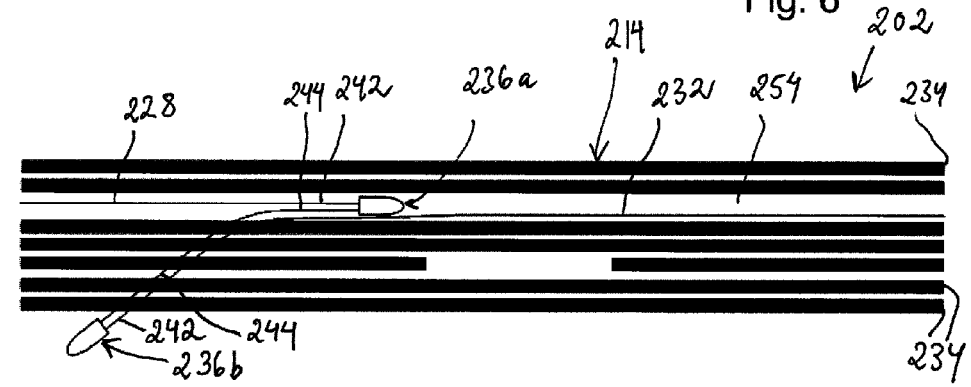

With reference to FIG. 5, along a certain axial extension of the composite cable 202 the outer jacket 216 has been removed to uncover the region where the jointing is to be performed. The first and second optical fibre cables 226 are located in the space 254 between at least two wires 234 of the plurality of wires 234. With reference to FIG. 6, the first optical fibre 228 is optically connected to the first optical fibre portion 242 of the first routing device 236a. The first optical fibre 228 may be optically connected to the first optical fibre portion 242 of the first routing device 236a by joining the first optical fibre 228 to the first optical fibre portion 242 of the first routing device 236a. The first optical fibre 228 may be joined to the first optical fibre portion 242 of the first routing device 236a by means of fusion splicing. Fusion splicing and equipment for fusion splicing are known to the person skilled in the art and are thus not disclosed in more detail. After the first optical fibre 228 has been optically connected to the first optical fibre portion 242 of the first routing device 236a, the first routing device 236a may be placed in the space 254 between at least two wires 234. With reference to FIG. 7, the second optical fibre 232 is optically connected to a first optical fibre portion 242 of the second routing device 236b. The second optical fibre 232 may be optically connected to the first optical fibre portion 242 of the second routing device 236b by joining the second optical fibre 232 to the first optical fibre portion 242 of the second routing device 236b. The second optical fibre 232 may be joined to the first optical fibre portion 242 of the second routing device 236b by means of fusion splicing. With reference to FIG. 7, the second optical fibre portion 244 of the first routing device 236a is optically connected to the second optical fibre portion 244 of the second routing device 236b. The second optical fibre portion 244 of the first routing device 236a may be optically connected to the second optical fibre portion 244 of the second routing device 236b by joining the second optical fibre portion 244 of the first routing device 236a to the second optical fibre portion 244 of the second routing device 236b. The second optical fibre portion 244 of the first routing device 236a may be joined to the second optical fibre portion 244 of the second routing device 236b by means of fusion splicing. With reference to FIG. 8, after the first and second optical fibres 228, 232 have been optically connected, the second routing device 236b may be placed in the space 254 between at least two wires 234. Thus, both the first and second routing devices 236a-b may be placed in the space 254 between at least two wires 234 of the plurality of wires 234. Advantageously, the first and second routing devices 236a-b are placed in the space 254 after the first and second optical fibres 228, 232 and the first and second optical fibre portions 242, 244 of the first and second routing devices 236a-b have been optically connected.

Alternatively, each of the first and second optical fibres 228, 232 may be optically connected, e.g. by being joined, to the first optical fibre portion 242 of the respective routing device 236a-b via an intermediate optical fibre part. The second optical fibre portion 244 of the first routing device 236a may be optically connected, e.g. by being joined, to the second optical fibre portion 244 of the second routing device 236b via an intermediate optical fibre part, or two or more additional routing devices.

Alternatively, the second optical fibre portion 244 of the first routing device 236a may be optically connected to the second optical fibre portion 244 of the second routing device 236b prior to optically connecting the second optical fibre 232 to the first optical fibre portion 242 of the second routing device 236b.

After the jointing of the first optical fibre 228 and the second optical fibre 232, the joint region may be covered and surrounded by a shrinking tube, e.g. made of a polymer material, by means of shrink fit to ensure that the joint region is waterproof or watertight.

A certain axial extension of one or a plurality of the wires 214 may be removed in the proximity of the two routing devices 236a-b, e.g. before the jointing of the first optical fibre 228 and the second optical fibre 232.

The features of the different embodiments of the apparatus and the method, respectively, disclosed above may be combined in various possible ways providing further advantageous embodiments.

The invention shall not be considered limited to the embodiments illustrated, but can be modified and altered in many ways by one skilled in the art, without departing from the scope of the appended claims.

The invention claimed is:

1. An apparatus for jointing a first optical fibre and a second optical fibre, the apparatus comprising:
    a composite cable, where the composite cable comprises an electric power cable, a first optical fibre cable comprising the first optical fibre, and a second optical fibre cable comprising the second optical fibre; and
    a first routing device and a second routing device, each routing device being arranged to change the direction of a fibre optic path from a first axis to a second axis and comprising a first optical fibre portion aligned with the first axis, a second optical fibre portion aligned with the second axis, and an intermediate optical fibre portion integral with the first and second optical fibre portions and extending through an arc between the first and second optical fibre portions, the intermediate optical fibre portion in the region of the arc having a reduced diameter in relation to the diameter of the first and second optical fibre portions,
    wherein the first optical fibre is optically connected to the first optical fibre portion of the first routing device, the second optical fibre is optically connected to the first optical fibre portion of the second routing device, and the second optical fibre portion of the first routing device is optically connected to the second optical fibre portion of the second routing device.

2. The apparatus according to claim 1, wherein the first optical fibre is joined to the first optical fibre portion of the first routing device, and the second optical fibre is joined to the first optical fibre portion of the second routing device.

3. The apparatus according to claim 1, wherein the second optical fibre portion of the first routing device is joined to the second optical fibre portion of the second routing device.

4. The apparatus according to claim 1, wherein the electric power cable comprises at least one electrical conductor and a circumferential cover located outside of the electrical conductor.

5. The apparatus according to claim 4, wherein the composite cable comprises a circumferential outer jacket located outside of the cover and of the electrical conductor, and the outer jacket surrounds the first and second optical fibre cables.

6. The apparatus according to claim 4, wherein the cover is at least partially formed by a plurality of wires and the first and second optical fibre cables.

7. The apparatus according to claim 6, wherein the cover is in the form of armouring.

8. The apparatus according to claim 6, wherein the composite cable comprises a circumferential electrically insulating layer located outside of the electrical conductor, the cover is in the form of a circumferential conductive screen located outside of the electrically insulating layer, and the screen is arranged to be held at ground potential.

9. The apparatus according to claim 6, wherein the first and second routing devices are positioned in a space between at least two wires of the plurality of wires.

10. The apparatus according to claim 1, wherein each of the first and second routing devices comprises an outer member holding at least the first and second optical fibre portions for fixing the first and second optical fibre portions along the first and second axes, respectively.

11. The apparatus according to claim 1, wherein the intermediate optical fibre portion of each of the first and second routing devices in the region of the arc has a substantially reduced diameter in relation to the diameter of the first and second optical fibre portions.

12. The apparatus according to claim 1, wherein the intermediate optical fibre portion of each of the first and second routing devices extends through an arc of radius of the order of two centimeters or less between the first and second optical fibre portions.

13. The apparatus according to claim 12, wherein the intermediate optical fibre portion of each of the first and second routing devices extends through an arc of radius less than 10 millimeters, preferably less than 5 millimeters, more preferably less than 3 millimeters, between the first and second optical fibre portions.

14. The apparatus according to claim 1, wherein the composite cable is a submarine composite cable.

15. A method for jointing a first optical fibre and a second optical fibre, the first optical fibre being included in a first optical fibre cable and the second optical fibre being included in a second optical fibre cable, and the first and second optical fibre cables are included in at least one composite cable which further comprises an electric power cable, wherein the method comprises the following steps:
    optically connecting the first optical fibre to a first optical fibre portion of a first routing device;
    optically connecting the second optical fibre to a first optical fibre portion of a second routing device, each routing device being arranged to change the direction of a fibre optic path from a first axis to a second axis and comprising the first optical fibre portion which is aligned with the first axis, a second optical fibre portion aligned with the second axis, and an intermediate optical fibre portion integral with the first and second optical fibre portions and extending through an arc between the first and second optical fibre portions, the intermediate optical fibre portion in the region of the arc having a reduced diameter in relation to the diameter of the first and second optical fibre portions; and
    optically connecting the second optical fibre portion of the first routing device to the second optical fibre portion of the second routing device.

16. The method according to claim 15, wherein the first optical fibre is optically connected to the first optical fibre portion of the first routing device by joining the first optical fibre to the first optical fibre portion of the first routing device, and in that the second optical fibre is optically connected to the first optical fibre portion of the second routing device by joining the second optical fibre to the first optical fibre portion of the second routing device.

17. The method according to claim 15, wherein the second optical fibre portion of the first routing device is optically connected to the second optical fibre portion of the second routing device by joining the second optical fibre portion of the first routing device to the second optical fibre portion of the second routing device.

18. The method according to claim 15, further comprising the step of jointing the first optical fibre and the second optical fibre that are at least partially surrounded by an outer jacket located outside of a circumferential cover and of an electrical conductor included in the electric power cable.

19. The method according to claim 18, further comprising the step of jointing the first optical fibre and the second optical fibre that are included in a first optical fibre cable and a second optical fibre cable, respectively, which together with a plurality of wires at least partially form the cover.

20. The method according to claim 19, further comprising the step of placing the first and second routing devices in a space between at least two wires of the plurality of wires.

21. The method according to claim 15, wherein the first optical fibre is joined to the first optical fibre portion of the first routing device by means of fusion splicing, and the second optical fibre is joined to the first optical fibre portion of the second routing device by means of fusion splicing.

22. The method according to claim 15, wherein the second optical fibre portion of the first routing device is joined to the second optical fibre portion of the second routing device by means of fusion splicing.

23. The method according to claim 15, further comprising the step of jointing the first optical fibre and the second optical fibre at least partially by means of an apparatus for jointing a first optical fibre and a second optical fibre, the apparatus comprising:

a composite cable, where the composite cable comprises an electric power cable, a first optical fibre cable comprising the first optical fibre, and a second optical fibre cable comprising the second optical fibre; and a first routing device and a second routing device, each routing device being arranged to change the direction of a fibre optic path from a first axis to a second axis and comprising a first optical fibre portion aligned with the first axis, a second optical fibre portion aligned with the second axis, and an intermediate optical fibre portion integral with the first and second optical fibre portions and extending through an arc between the first and second optical fibre portions, the intermediate optical fibre portion in the region of the arc having a reduced diameter in relation to the diameter of the first and second optical fibre portions, wherein the first optical fibre is optically connected to the first optical fibre portion of the first routing device, the second optical fibre is optically connected to the first optical fibre portion of the second routing device, and the second optical fibre portion of the first routing device is optically connected to the second optical fibre portion of the second routing device.

\* \* \* \* \*